(12) United States Patent
Hodgekins et al.

(10) Patent No.: US 7,736,092 B2
(45) Date of Patent: Jun. 15, 2010

(54) TRENCH DRAIN WITH SLOPING RAILS

(75) Inventors: Barry Hodgekins, Michigan City, IN (US); Craig Swider, Michigan City, IN (US); Curtis Held, Michigan City, IN (US)

(73) Assignee: Josam Company, Philadelphia, PA (US)

( * ) Notice: Subject to any disclaimer, the term of this patent is extended or adjusted under 35 U.S.C. 154(b) by 0 days.

(21) Appl. No.: 11/762,769

(22) Filed: Jun. 13, 2007

(65) Prior Publication Data

US 2007/0293008 A1 Dec. 20, 2007

Related U.S. Application Data

(60) Provisional application No. 60/813,731, filed on Jun. 13, 2006.

(51) Int. Cl.
*E02B 5/02* (2006.01)

(52) U.S. Cl. .............................. 405/119; 249/11; 404/2

(58) Field of Classification Search ......... 405/118–119, 405/121–123; 404/2–5; 249/10–11
See application file for complete search history.

(56) References Cited

U.S. PATENT DOCUMENTS

| | | | |
|---|---|---|---|
| 1,584,756 A * | 5/1926 | Dougherty | ................... 264/33 |
| 3,888,712 A | 6/1975 | Akiyoshi et al. | |
| 4,472,078 A | 9/1984 | Karbstein | |
| 4,663,894 A * | 5/1987 | LaRoche et al. | ................ 52/15 |
| 4,878,782 A * | 11/1989 | Beattie et al. | ................ 405/119 |
| 5,026,202 A * | 6/1991 | Thomann | ........................ 404/4 |
| 5,226,748 A | 7/1993 | Barenwald et al. | |
| 7,048,466 B2 | 5/2006 | Benesteau et al. | |
| 7,264,418 B1 * | 9/2007 | Houck et al. | ................... 405/43 |
| 2009/0097921 A1 * | 4/2009 | Hetzler et al. | ................ 405/119 |

OTHER PUBLICATIONS

International Search Report and Written Opinion mailed Dec. 19, 2008 in PCT Application No. PCT/US08/81194.
International Search Report and Written Opinion for corresponding PCT Application No. PCT/US07/13957, mailed on Jul. 30, 2008, 6 pp.
Declaration of Barry J. Hodgekins, Dec. 5, 2008.
Declaration of Robert A. Green, Dec. 17, 2008.

* cited by examiner

*Primary Examiner*—Sunil Singh
(74) *Attorney, Agent, or Firm*—Christie, Parker & Hale, LLP.

(57) ABSTRACT

A modular trench drain system with sloping overlay rails. A non-sloping section of trench drain is transformed into a sloping trench drain by installing sloping overlay rails. The overlay rails rest on the top of the upper edge of the sidewalls and may have a ledge which allows grating, which spans across the channel, to rest on top. The modular channels sections may be held together and in place by a clip with holes for accepting support rods which further secure the channels in place before and after the concrete has been poured and cured around the channels.

20 Claims, 8 Drawing Sheets

TRENCH DRAIN WITH SLOPING RAILS

CROSS-REFERENCE TO RELATED APPLICATION(S)

This application is claims the benefit of U.S. provisional patent application No. 60/813,731, filed Jun. 13, 2006, the disclosure of which is hereby incorporated by reference in its entirety for all purposes.

BACKGROUND

The general concept of trench drains is well known in the prior art. Trench drains are generally used to transport large amounts of liquid from one location to another. Typically, trench drains are used to collect liquid runoff from residential and commercial structures and deliver the runoff to a sewer system.

Current trench drains are typically modular in design and constructed of light weight polymers, such as fiberglass reinforced polyester. Typically, the trench drains consist of channels that have two sidewalls separated by a bottom wall. To install the trench drains, a trench is typically dug to a depth twice as deep as the height of the sidewalls, such that the top of the sidewall is about ⅛" below the surrounding surface. Modular trench drain pieces, typically in about 1 meter lengths, are connected and sealed together. Concrete is poured in the bottom of the trench, the connected trench drain pieces are placed on top, and then concrete is poured around the trench drain up to a height approximately equal to the sidewall.

Because the top of a trench drain remains level, the slope is typically built into the channel itself. To accomplish this, each section of trench drain, as the drain slopes down, has higher sidewalls than the prior, adjacent section of trench drain. Thus, many different molds are needed to cast and form construct each section of the sloping trench drain. Suppliers will also need to keep a supply of each different section of sloping channel.

SUMMARY OF THE INVENTION

In one embodiment of the invention, a modular, non-sloping section of trench drain is transformed into a sloping section of trench drain by installing sloping overlay rails. The overlay rails rest on the top of the upper edge of the sidewalls.

In another embodiment, the sloping overlay rails have a ledge which allows grating, which spans across the channel, to rest on top.

In yet another embodiment, the channels are held together and in place by a clip with a hole(s) for accepting a support rod, typically rebar, to further secure the channel in place before and after the concrete has cured.

DETAILED DESCRIPTION OF EXEMPLARY EMBODIMENTS

In one embodiment of the invention, a modular, non-sloping section of trench drain is transformed into a sloping section sloping trench drain by installing sloping overlay rails.

Figure 1:
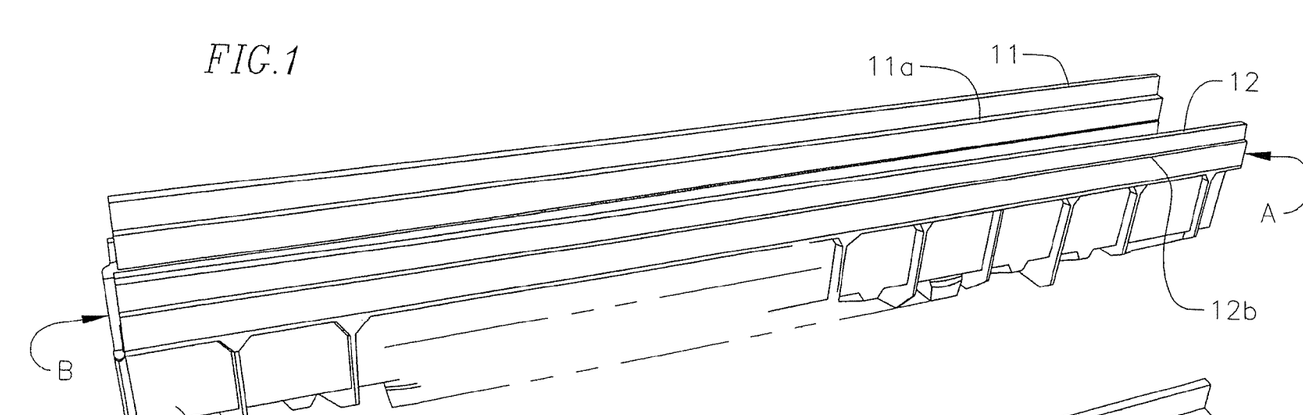
FIG. 1 is a side perspective view of a trench drain with sloping overlay rails according to one embodiment of the invention.
Figure 2:
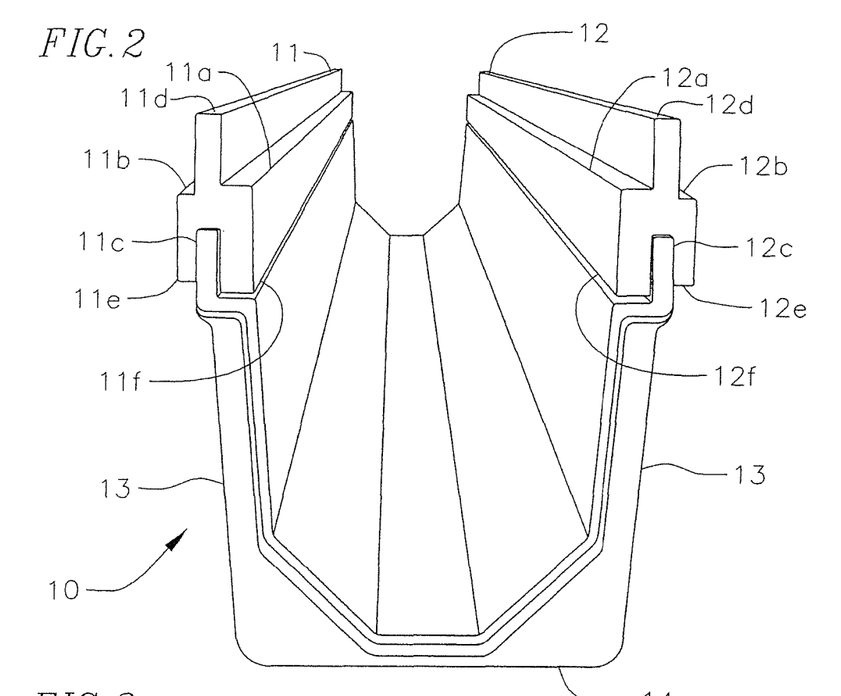
FIG. 2 is an end view of a trench drain with sloping overlay rails according to one embodiment of the invention.
Figure 3:
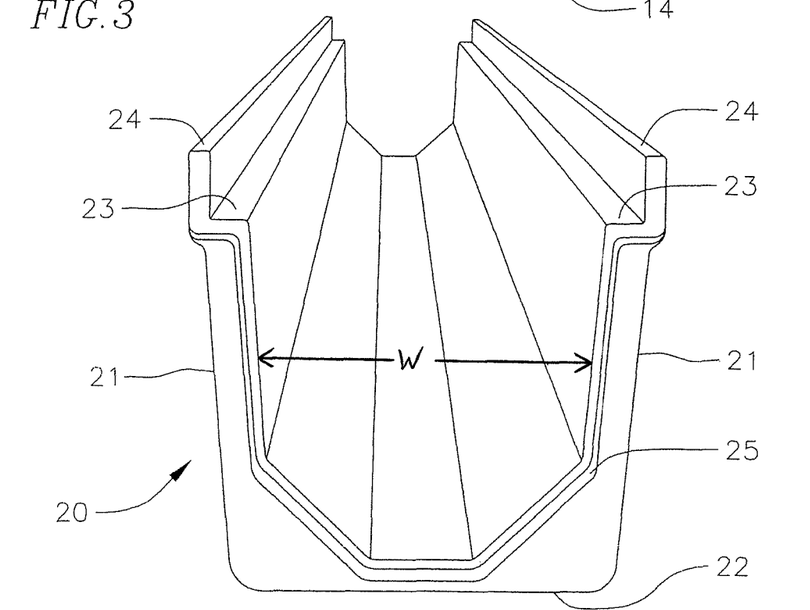
FIG. 3 is a trench drain channel without sloping overlay rails according to one embodiment of the invention.

According to an embodiment of the invention, as shown in FIG. 1, sloping overlay rails 11, 12 are mounted on a non-sloping, modular trench drain component 13 to create a sloping trench drain 10. As shown in FIG. 3, the non-sloping modular trench drain component 20, comprises sidewalls 21 spaced apart by a width W, and a bottom section 22. Each sidewall 21 has an upper edge 24 and an inner shelf 23 below the upper edge 24. There is also a flange with a groove 25 at one end of the modular trench drain component 20, which flange may correspond to a "female" end and is dimensioned and adapted to receive a corresponding "male" end. The other end of the trench drain component 20, the "male" end (not shown), is dimensioned and adapted be inserted into the "female" end, to make a tight fitting joint. In an embodiment, the joint is held together with an adhesive and is watertight. The bottom of each overlay rail 11, 12 has an inverted U-shaped groove. As shown in FIG. 2, each overlay rail 11, 12 comprises an inner ledge 11a, 12a respectively, and an outer ledge 11b, 12b respectively. As shown in FIGS. 2 and 3, the bottom of the inner ledge 11f, 12f rests on the top of the inner shelf 23 of the non-sloping modular trench drain component 20.

Figure 5:
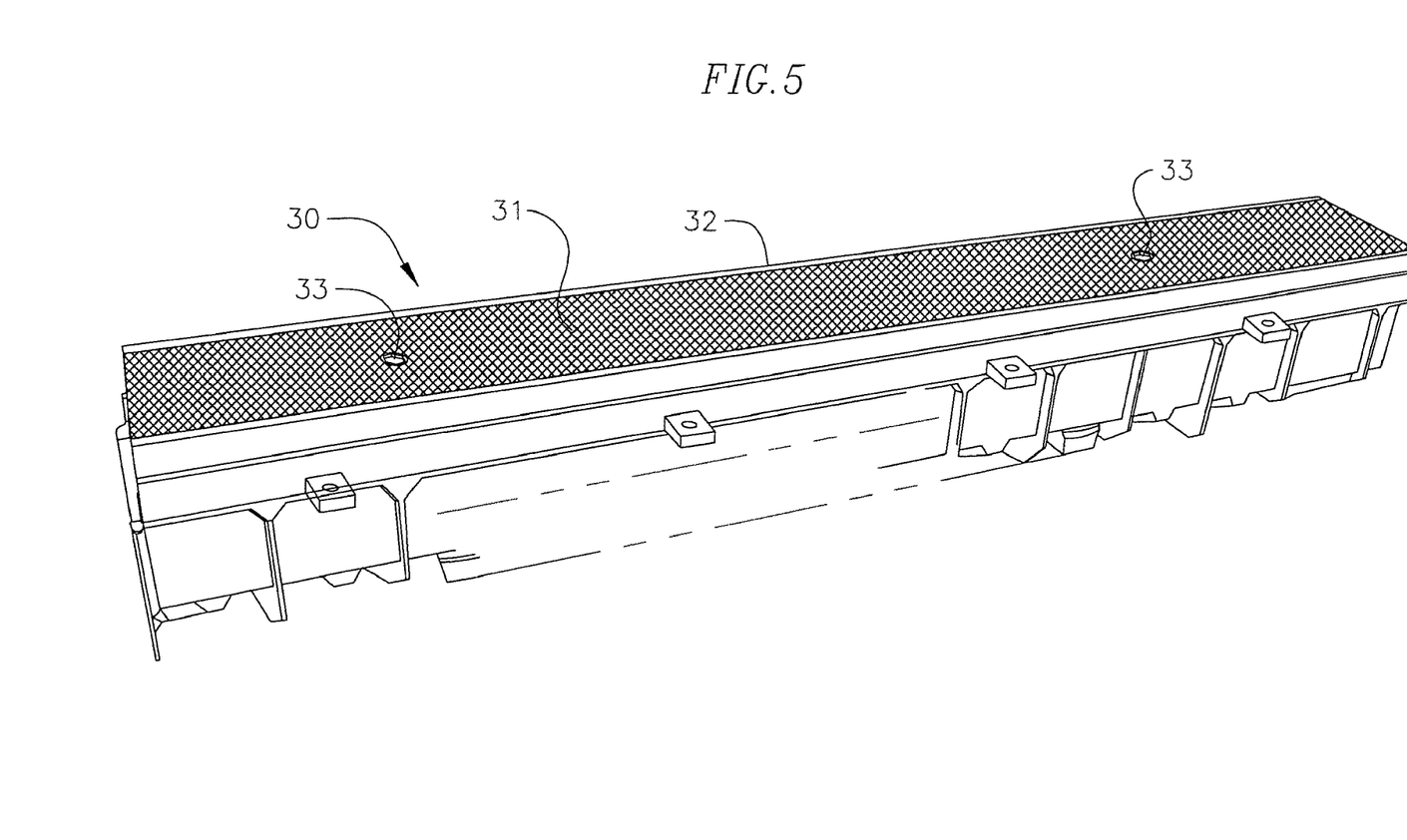
FIG. 5 is a side perspective view of a trench drain with sloping overlay rails and installed grating according to one embodiment of the invention.

In another embodiment, the vertical distance from the inner ledge 11a, 12a, to the top of the overlay rail 11d, 12d is constant throughout the length of the overlay rail 11, 12. As shown in FIG. 5, this allows grating 31 that is level with the top rail 32 to be installed on the sloping trench drain 30.

In an additional embodiment, as shown in FIGS. 1 and 2, the vertical distance from 11a, 12a to 11f, 12f increases linearly from end A to end B, thereby creating the sloped trench drain 10. For the outside of the overlay rail 11, 12 the vertical distance from the top of the rail 11d, 12d to the outer ledge 11b, 12b increases as the slope increases, and the distance from the outer ledge 11b, 12b to the bottom of the outer leg 11e, 12e is constant. In one embodiment the rail increases in height at a rate of 0.50% to 1.00%, and in another embodiment it increases in height at a rate of about 0.75%. Thus, for a 1 meter section of trench drain having rails that increase in height at a rate of 0.75%, the increase from end A to end B would be about 0.0075 meters or about 0.295 inches. In another embodiment, fifteen different 1 meter sections of trench drain are connected together with sloping overlay rails having a 0.75% rate of increase in height, yielding a height differential of 0.1125 meters or 4.425 inches between the beginning of the first section and end of the last section. In one embodiment, the overlay rails are 1 mm shorter than the channel section to allow for some linear expansion, although a larger gap may be used.

Figure 4A:
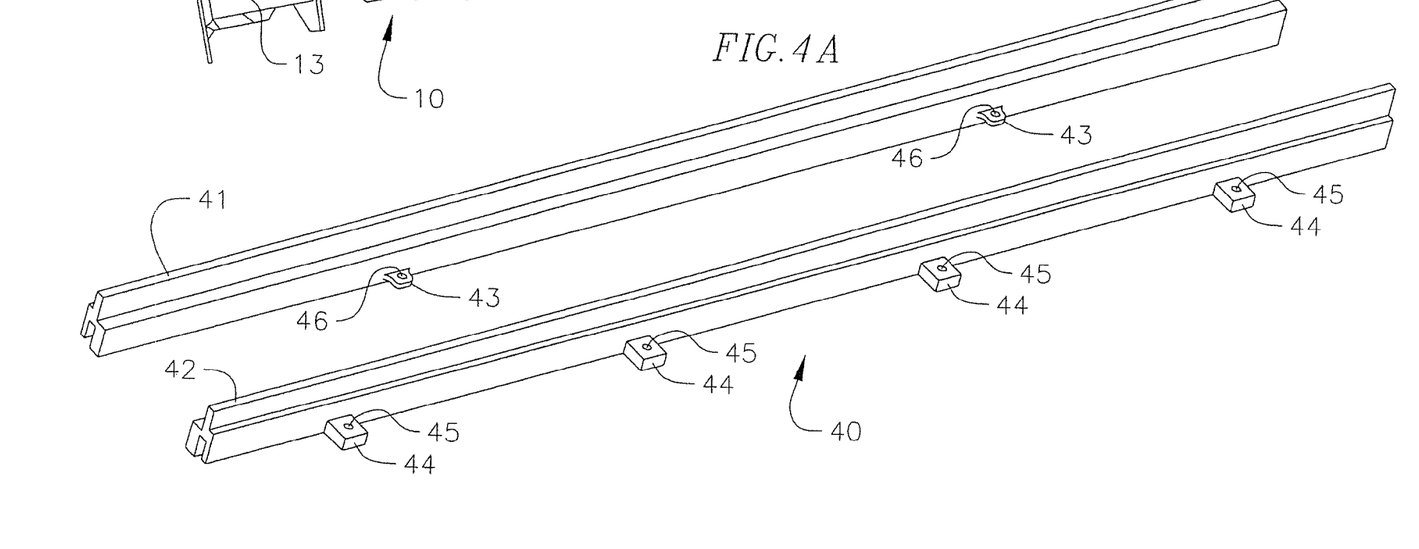
FIG. 4A is an overhead perspective view of the overlay rails according to one embodiment of the invention.
Figure 4B:
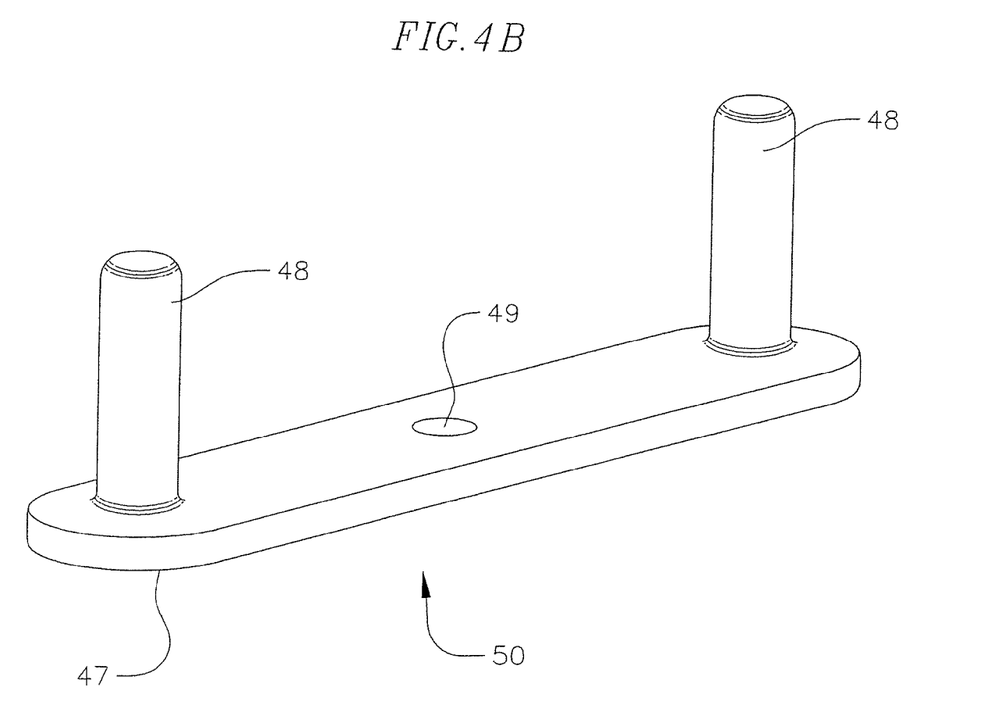
FIG. 4B is an overhead perspective view of an anchor clip according to one embodiment of the invention.

According to one embodiment, as shown in FIG. 4A, each separate rail 41, 42 in the matched pair 40 is a mirror image of the other. Each section of trench channel will require a different matched pair of overlay rails to create continuously sloping trench drain system. The height at the end of the overlay rail of the previous section of trench drain should correspond to the beginning height of the overlay rail of the next section of trench drain, so as to make a continuously sloping trench drain system. In another embodiment, the outside edge of each rail 41, 42 contains four anchor lugs 44, with center openings 45. Each rail 41, 42 may contain more or less than four anchor lugs 44. The lugs 44 enhance positive anchoring during the concrete pour and the center the allows attachment of wire mesh (not shown) prior to the concrete pour. In yet another embodiment, the inside edge of each rail 41, 42 contains two anchoring tabs 43 with a center hole 46. Each rail 41, 42 may contain more or less than two anchoring tabs 43. In one embodiment, an anchoring clip 50, as shown in FIG. 4B is inserted into an anchoring tab center hole 46 on a rail 41 and a corresponding center hole 46 on the opposite rail 42. The anchoring clip 50 assists in maintaining a constant distance between the two separate rails 41, 42. Thus, neither pressure exerted inward from poured concrete, nor pressure exerted outward from the molded draft of the modular channel will significantly change the upper span between the rails 41, 42.

In an embodiment, as shown in FIG. 4B, the anchoring clip 50 comprises a top 47 plate with two pins 48, and a center hole 49. In one embodiment, the distance between the two pins 48 corresponds to the distance between the anchor tab center holes 46, opposite each other on rails 41, 42. In yet another embodiment, the center hole 49 is used for a grate locking device and lines up with bolt holes 33 in the grating 31 as shown in FIG. 5. In one embodiment, the anchoring clip 50 is inserted into corresponding holes 46 with the pins facing down. If it is desired to use a grating lock device, the anchoring clip 50 may be inserted with the pins facing up as discussed below with reference to FIGS. 10A-D.

Figure 6:
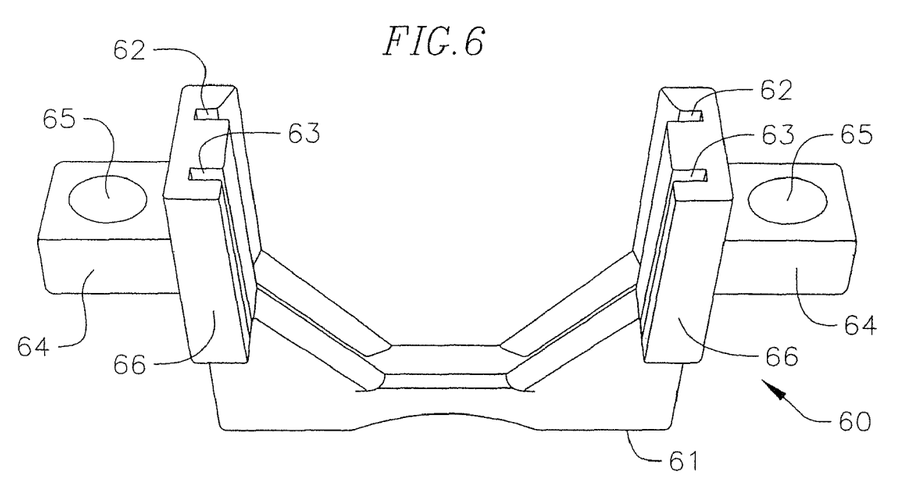
FIG. 6 is a side perspective view of a channel bracket according to one embodiment of the invention.
Figure 7:
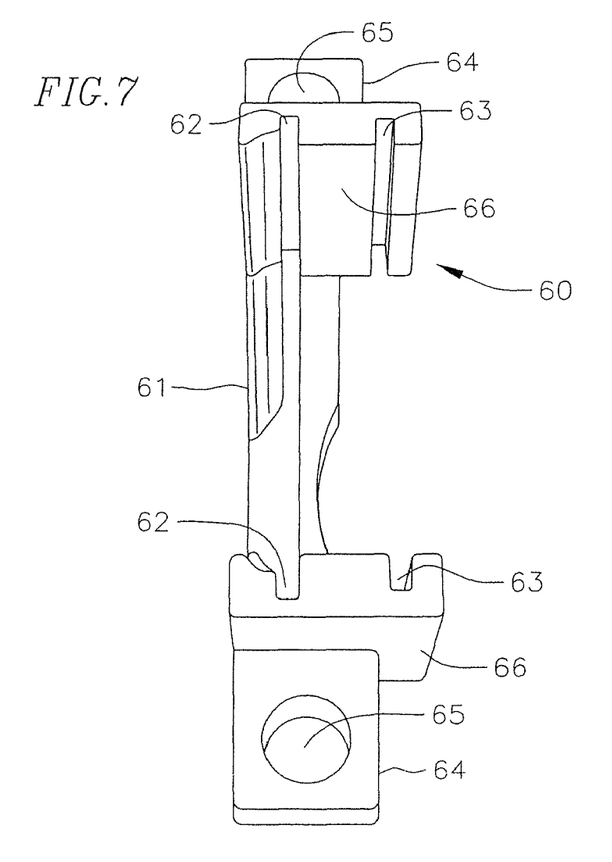
FIG. 7 is an overhead perspective view of a channel bracket according to one embodiment of the invention.
Figure 8:
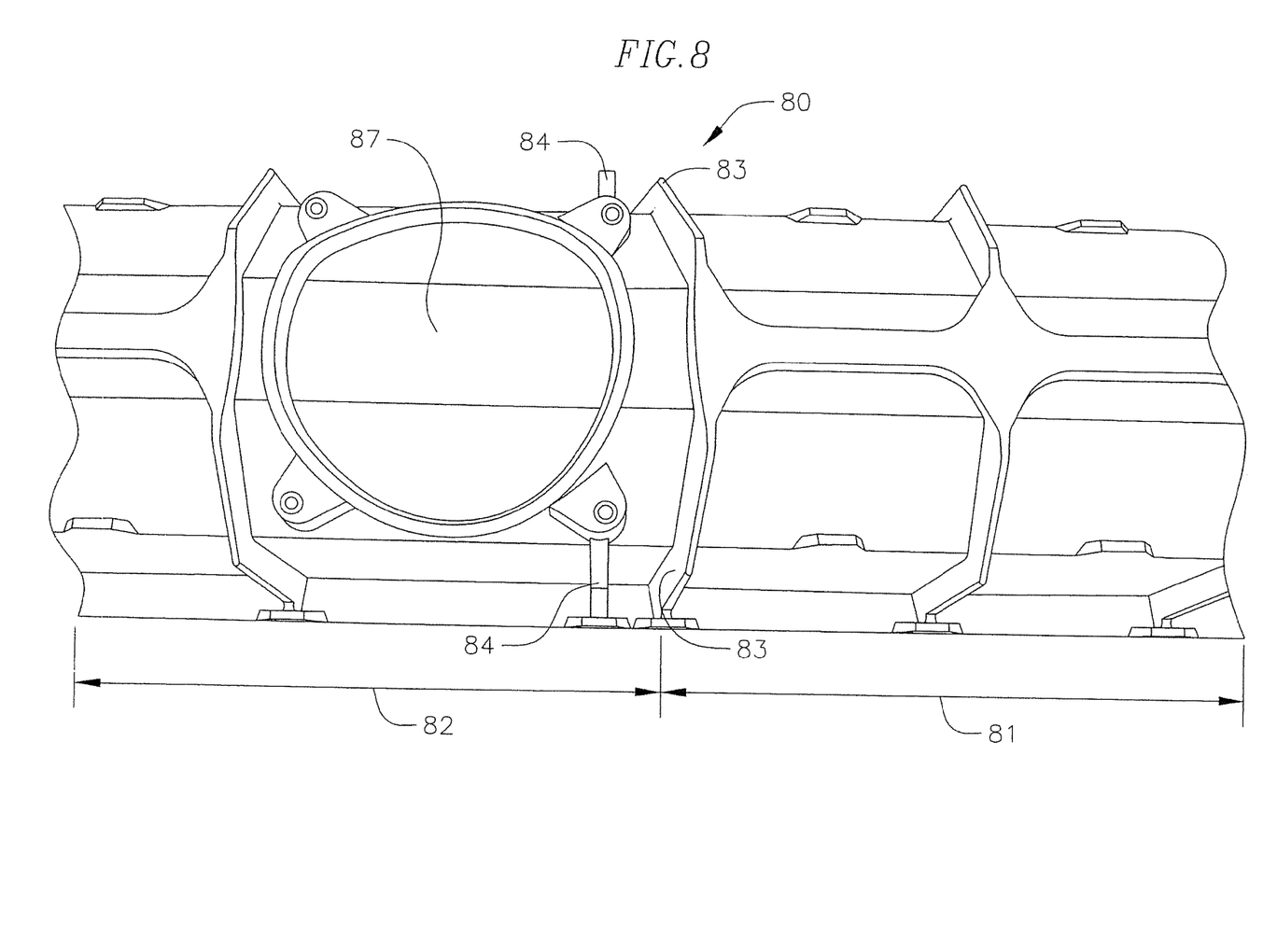
FIG. 8 is and overhead view of the underside of two sections of trench drain channel joined before adding a channel bracket according to one embodiment of the invention.

In an embodiment, as shown in FIGS. 6-9, different sections of the modular trench drain component are joined together with brackets to create longer sections of trench drain. Note that the sloping overlay rails are not shown in FIGS. 8 and 9 because the Figs. show the bottom portion of the trench drain system. As shown in FIG. 8, one section of modular trench drain channel 81 is joined to another section of trench drain channel 82. In an embodiment, trench drain channel 81 is the female end with a flange 83, and trench drain channel 82 is the male end with securing tabs 84. In one embodiment, trench drain channel 82 has a circular cutout 87 for a round discharge pipe (not shown).

According to one embodiment, to secure and assist in stabilizing the modular trench drain, channel brackets 60 are used as shown in FIGS. 6 and 7. In an embodiment, the channel bracket 60 comprises a base 61, connected to two side walls 66, and two anchor tabs 64 on the sidewalls 66. In one embodiment, each sidewall 66 has two grooves 62, 63, dimensioned to receive flanges 83 or securing tabs 84 located on modular trench channel sections as shown on FIG. 8. In another embodiment, only a portion of each sidewall is connected to the base 61, and one section containing one of the groves 63 is cantilevered from the base 61. One of the grooves 62 continues from the top of the clip down through the base 61 of the clip. The other groove 63 is only present on the cantilevered portion of the sidewall that is not connected to the base 61. In another embodiment, the anchor tabs 64 have two center holes 65 which are dimensioned to receive a piece of rebar (not shown).

Figure 9:
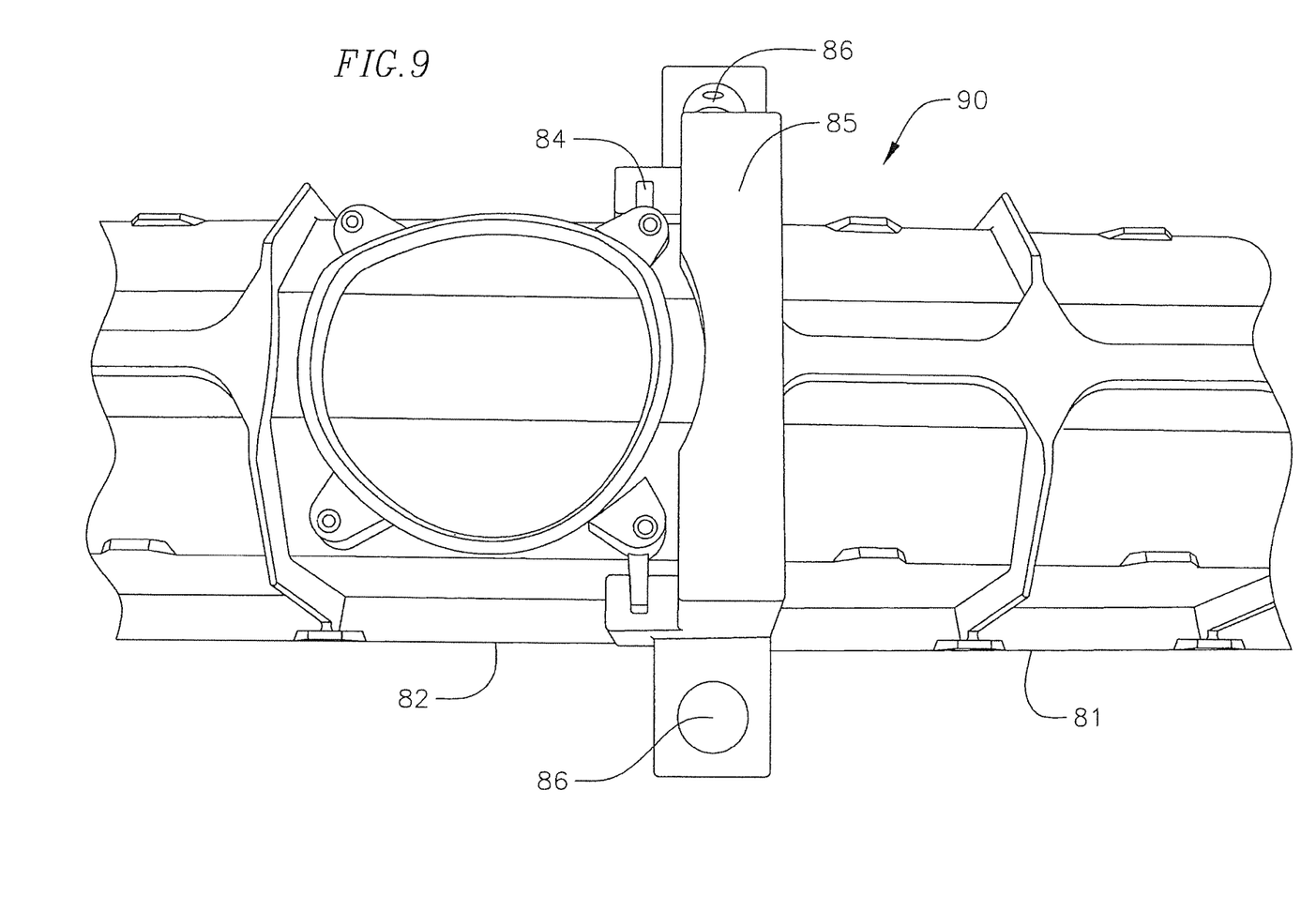
FIG. 9 is an overhead view of the underside of two sections of trench drain channel joined with a channel bracket according to one embodiment of the invention.
Figure 10A:
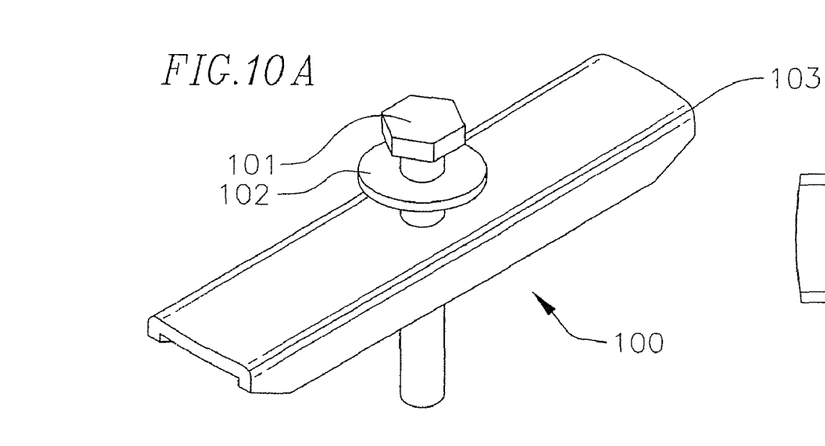
FIGS. 10A-D show various views of the lock device for the grates according to one embodiment of the invention.
Figure 10B:
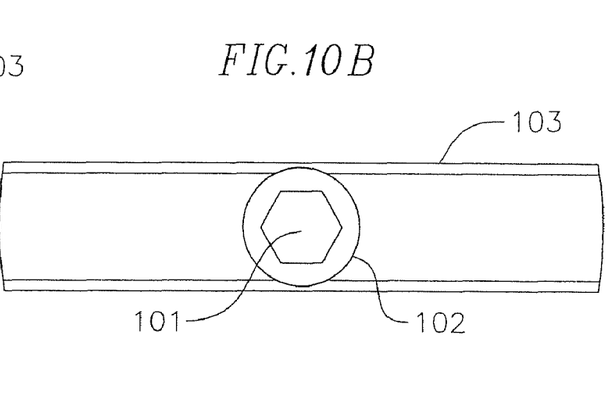
Figure 10C:
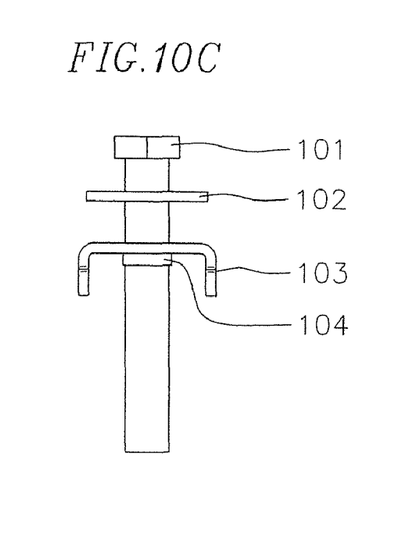
Figure 10D:
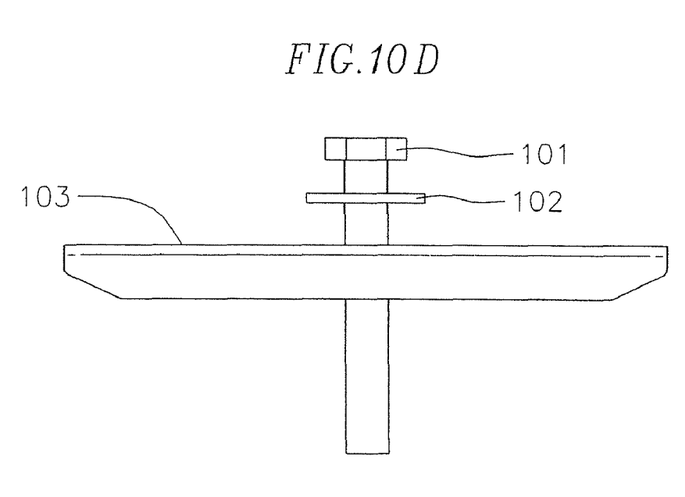

In an embodiment, as shown in FIG. 9, a channel bracket 85 is mounted over a flange (not shown) and a securing tab 84 to secure two sections of trench channel 81, 82 together. Center holes 85 may receive rebar (not shown) to anchor the secured sections prior to pouring the concrete, as well as after the concrete has cured.

In one embodiment, as shown in FIGS. 10A-D, a locking device 100 is used to hold down slotted grates and solid covers and comprises a bolt 101, a washer 102, and a threaded flange 103. In another embodiment, the flange may be used in conjunction with the anchor clip 50 shown in FIG. 4B. The anchor clip 50 would be installed with the pins facing up, and the bolt 101 with a washer 102 would be inserted through a hole in the grating, like hole 33 in FIG. 5, and the flange 103 would be placed under the anchor clip 50, so that the bolt 101 may be inserted into the threads 104 of the flange 103 and tightened.

Various materials may be used for the different components of the trench drain system. In one embodiment, the channel is constructed of fiberglass, polypropylene, polyethylene, polymer concrete, concrete, or combinations thereof In another embodiment, the overlay rails may be constructed of polypropylene, polyethylene, or a combination thereof. In a further embodiment, the rails are constructed of the same material as the channel, fiberglass, polymer concrete, or combinations thereof. In one embodiment, the anchor clips may be constructed of PVC, plastic, steel, aluminum, and combinations thereof. In a further embodiment, polyurethane may be used as a sealer/adhesive between the channel sections, however any commonly known sealer in the art may be used. In an embodiment, the grating lock device is constructed out of stainless steel or galvanized steal, although other materials may be used for various parts such as plastics for the flange.

While this invention has been described in connection with what are considered to be exemplary embodiments, it is to be understood that the invention is not limited to the disclosed embodiments, dimensions, and configurations but, on the contrary, also extends to various modifications and equivalent arrangements. The invention is limited only by the claims and their equivalents.

What is claimed is:

1. A trench drain comprising:
    an open-faced channel comprising two sidewalls connected to a bottom wall, said channel having a first end and a second end and a width between the two sidewalls, wherein each sidewall comprises an upper edge; and
    a pair of sloping overlay rails, wherein each sloping overlay rail rests on an upper edge of one of the sidewalls, and wherein the rails are separate from each other for use with the channel regardless of said width, and
    wherein each rail has at least one inner ledge portion, a first portion above the inner ledge portion, and a second portion below the inner ledge portion, and wherein the first portion is constant in height, and wherein the second portion is sloped between a first end and a second end of the rail.

2. The trench drain of claim 1, wherein the channel and rails are formed of polymeric materials.

3. The trench drain of claim 1, wherein each overlay rail has a first height above the sidewall upper edge at the first end of the channel which linearly slopes to a second height at the second end of the channel.

4. The trench drain of claim 3, wherein the channel is of substantially uniform height.

5. The trench drain of claim 1, wherein each overlay rail comprises a slot dimensioned to receive the upper edge of the sidewall.

6. The trench drain of claim 1, wherein the slope is in the range 0.50% to 1.00% of a length of the rail.

7. The trench drain of claim 6, wherein the slope is about 0.75% of the length of the rail.

8. The trench drain of claim 1, wherein the first end of the channel is adapted to engage the second end of the channel of an adjacent trench drain.

9. The trench drain of claim 8, wherein the first end of the channel is secured to the second end of an adjacent trench drain channel using a channel bracket.

10. The trench drain of claim 9, wherein the channel bracket comprises a center hole dimensioned to accept a support rod.

11. The trench drain of claim 1, wherein the overlay rails have inner and outer surfaces, the inner surfaces having anchor tabs extending inwardly therefrom to receive anchoring clips joining the overlay rails.

12. The trench drain of claim 11, wherein each of the anchor tabs has a central opening, and the anchoring clips have pins receivable within the central openings of the tabs.

13. The trench drain of claim 1, wherein the sloping overlay rails are connected by an anchoring clip.

14. A sloping trench drain comprising:
a first channel comprising two sidewalls connected by a bottom wall, the first channel having a first end and a second end;
a second channel comprising two sidewalls connected by a bottom wall, the second channel having a first end and a second end, wherein the second end of the first channel engages the first end of the second channel to connect the first and second channels;
wherein each sidewall comprises an upper edge;
first and second overlay rails resting on the upper edge of the respective sidewalls of the first channel; and
third and fourth overlay rails resting on the upper edge of the respective sidewalls of the second channel;
wherein the first and second overlay rails comprise a first height above the upper edge of the sidewalls of the first channel at the first end of the first channel, the first height sloping to a second height at the second end of the first channel; and
wherein the third and fourth overlay rails comprise a third height above the upper edge of the sidewalls of the second channel at the first end of the second channel, the third height sloping to a fourth height at the second end of the second channel,
wherein each rail has at least one inner ledge portion, a first portion above the inner ledge portion, and a second portion below the inner ledge portion, and wherein the first portion is constant in height, and wherein the second portion is sloped between a first end and a second end of the rail, and
wherein the first, second, third, and fourth overlay rails are separate from each other and are independently mounted to the respective sidewalls.

15. The sloping trench drain of claim 14, wherein the second height approximately equals the third height.

16. The sloping trench drain of claim 14, wherein the first and second channels each have a uniform height.

17. The sloping trench drain of claim 14, wherein each overlay rail comprises a groove dimensioned to engage the upper edge of the respective sidewall.

18. The sloping trench drain of claim 14, wherein the first and second overlay rails are connected by an anchoring clip.

19. A sloping trench drain, comprising:
first and second U-shaped channels connected end-to-end; and
first and second pairs of overlay rails resting on a top edge of the first and second channels, respectively,
wherein the overlay rails are progressively sloped from a first end of the first pair of rails to a second end of the second pair of rails, and wherein each rail has at least one inner ledge portion, a first portion above the inner ledge portion, and a second portion below the inner ledge portion, and wherein the first portion is constant in height, and wherein the second portion is sloped between the first end and the second end of the rail.

20. A method for transforming a non-sloping channel into a sloping channel, comprising:
providing a non-sloping channel having two sidewalls connected to a bottom wall;
providing first and second sloping rails that are separate from each other, wherein each rail has at least one inner ledge portion, a first portion above the inner ledge portion, and a second portion below the inner ledge portion, and wherein the first portion is constant in height, and wherein the second portion is sloped between a first end and a second end of the rail; and
individually mounting each rail to one of the sidewalls of the channel to create a sloping channel.

\* \* \* \* \*